United States Patent Office 3,546,093
Patented Dec. 8, 1970

3,546,093
RUBBER OILS FROM LAGOMEDIO CRUDE
William W. Wentzheimer, Drexel Hill, Pa., and Edward T. Minka, Claymont, Del., assignors to Sun Oil Company, Philadelphia, Pa., a corporation of New Jersey
No Drawing. Filed Dec. 31, 1968, Ser. No. 788,343
Int. Cl. C10g 43/08
U.S. Cl. 208—33          17 Claims

ABSTRACT OF THE DISCLOSURE

A process for preparing rubber oils from Lagomedio crude by solvent extracting a lube oil fraction thereof with a solvent having preferential solubility for aromatics, such as furfural, and then cooling the extract to a temperature at least as low as 170° F. to form a wax phase and a solvent-oil phase, then recovering the oil from the solvent phase.

---

This invention broadly relates to the preparation of rubber oils and, more particularly, to the preparation of rubber oils from Lagomedio crude.

BACKGROUND OF THE INVENTION

In the refining of petroleum, it has been a conventional operation for many years to solvent extract the lubricating oil fractions of a crude oil with a solvent having preferential solubility for aromatics, such as furfural and phenol, to upgrade the quality of the lubricating oil fraction. The extract from such operations is, of course, highly aromatic and has been a major source for rubber oils used by the rubber compounding industry. In more recent times, it has been discovered that in lieu of solvent extraction a lubricating oil fraction can be upgraded, particularly its viscosity index, by a process termed "hydrocracking" wherein polycyclic compounds therein, instead of being removed, are transformed into fewer ringed compounds of less aromatic character. Recently, it has been found by others that there are several advantages in extracting a lube oil fraction that is to be hydrocracked before same is charged to the hydrocracker. The extract is also a highly aromatic extract and, therefore, is roughly equivalent to that from conventional solvent refining and therefore suitable for rubber oils. Regardless of any further processing contemplated for the raffinate, we have found, quite surprisingly, that when a Lagomedio lube fraction is solvent extracted with a solvent having preferential solubility for aromatics the extract is apparently very waxy and unsuitable as a rubber oil because of the waxy content. This is quite surprising because waxes are essentially paraffinic compounds and it is generally believed that they are not removed by solvents having preferential solubility for aromatics. It is, of course, well known that waxes can be removed from lube oil fractions (i.e., usually a raffinate) by a solvent; however, the class of solvents employed for this is entirely different from that employed for removing aromatics from lube oil fractions. Conventionally, waxes are removed by such polar solvents as methyl ethyl ketone. The structure of this waxlike material is unknown to us at the present time. We, however, have found a very satisfactory way of obviating this most surprising and unexpected experience with the extract of a Lagomedio crude whereby the residue of the aromatic extract is not only satisfactory as a rubber oil, but is also of high qaulity.

SUMMARY OF THE INVENTION

A process for preparing rubber oils from a Lagomedio crude which comprises solvent extracting a lubricating oil fraction of a Lagomedio crude with a solvent having preferential solubility for aromatics, recovering an extract phase, and cooling said extract phase to a temperature at least as low as about 170° F.

DETAILED DISCUSSION

Because of the manner in which commercial operations are carried out we believed that Lagomedio crude was unique in exhibiting this surprising phenomena of containing a waxlike material which is extracted in significant amounts by a solvent having preferential solubility for aromatics. Only recently we have found that Lagomedio may not be unique in respect to wether a waxlike material is extracted with the usual aromatics in such an extraction of a lube oil fraction. The foregoing has been determined on the basis of recent laboratory experiments and commercial experience using different techniques for determining the wax content of a lube oil extract. To be more specific, a Lagomedio lube oil fraction containing about 10.2% wax was solvent extracted with furfural at a temperature of about 220° F. using a solvent dosage of about 150%. In the case of a lube fraction from a standard solvent mix crude containing about 12.5% of wax material when solvent extracted with furfural at conditions which are roughly comparable to the extraction of the Lagomedio fraction, the extract when recovered as a rubber oil in commercial operations has been typically found to contain less than 1% (i.e., about 0.4%) wax. In surprising and apparent contradistinction, the recovered extract fraction from the Lagomedio crude was found to contain about 2.7% of a waxlike material. Our work is continuing to determine if our experience on wax content of the extract from Lagomedio is in some way unique or occurs in other extractions and the wax can be removed in the same general fashion as with the Lagomedio extract.

As to the solvents that may be employed in extracting the aromatic material from the Lagomedio crude, we contemplate that the solvents conventionally used in extracting aromatics from petroleum fractions can be employed. Such solvents include furfural, phenol, 2,2'-dichlorodiethyl ether, acetophenone, acetonitrile, nitrobenzene, aniline, dimethyl sulfoxide, and mixtures thereof. Furfural and phenol are the preferred solvents.

The temperatures of the extraction and solvent dosage are interdependent and vary inversely with respect to each other. Accordingly, the following comments are to be understood as so qualified.

The temperature of the extraction, whether carried out in one or more stages, must be below the temperature of miscibility of the oil and the solvent in order to have any extractive separation and usually well below the temperature of miscibility for a highly efficient operation with good yields of lube oil raffinate and a very aromatic-rich extract. The lower limit of temperature is controlled largely by economic considerations. If the extraction temperature is too low, the extraction will be too selective and require application of compensating features such as additional extraction stages or solvent dosage to obtain satisfactory yields of extract and improvement in the quality of the lube oil raffinate. The temperature range encompassing all of the suitable operating temperatures for all of the solvents is, generally speaking, about 0° to 350° F. In the case of furfural, however, a temperature in the more restricted range of about 125° to 325° F. is preferably employed.

Many of the same comments above in regard to temperature are equally applicable to the ratio of solvent to oil employed. That is, the temperature and solvent ratios are interdependent on each other. High ratios of solvent to oil like high temperatures tend to reduce the efficiencies of the operation, producing lower yields of lube oil raffinate and a less aromatic-rich extract and, accordingly, are to be avoided. For the most part, at the suitable temperatures specified hereinabove, solvent to oil ratios in the range of about 6:1 to about 0.25:1 will be found satisfactory. However, ratios of solvent to oil on the order of about 4 to 0.8:1 will be found preferred.

Since lube oil fractions typically include the fraction of a crude boiling over a wide range, it may be desirable on occasion to separate the lube fraction into several fractions and treat each separately. For example, all of the material boiling above 650° F., with the exception of those components such as asphaltenes and metals which are conventionally removed by deasphalting, are employed as lube oil stocks by the refiner. Accordingly, the heavier fractions that contain asphaltenes, metals, etc., are preferably first deasphalted before the solvent extraction.

It is believed that any further discussion of the temperature, solvent dosage, and the separate treatment of portions of lube fraction variables will be better understood by reference to an example. Thus, a Lagomedio crude fraction boiling in the range of about 850° to 950° F. is preferably solvent extracted at a temperature of about 200° to 250° F. at a solvent dosage in the range of about 1:2 parts by volume of furfural per volume of treated oil. The fraction boiling above 950° F. from the same crude which has been deasphalted with propane is preferably solvent extracted at a temperature of about 225° to 275° F. at a solvent dosage of about 2:3 volumes of furfural per volume of treated oil.

The equipment that may be employed is not critical, as any conventional solvent extraction equipment can be employed. For example, rotating disc contactors, Podbielniak extractors, and countercurrent packed bed extraction columns may be named as illustrative. As will be apparent from the foregoing, the extraction can be carried out in either a batchwise operation or on a continuous basis, although the latter is generally found more convenient, economic, and preferred.

The dewaxing step is relatively simple and easy to carry out. However, unlike conventional dewaxing of lubes which is carried out to improve the pour point of the finished lube, this dewaxing operation is carried out on an aromatic extract at higher temperatures. Furthermore, conventional dewaxing is generally carried out on a lube oil fraction of a different character. It is carried out on either a raffinate or prior solvent refining or, alternatively, the product of a hydrogenation treatment such as hydrocracking. On the other hand, the present dewaxing operation is carried out on an aromatic extract from an extraction of a lube fraction at a different temperature range than is conventionally employed for solvent refining of a Lagomedio derived lube fraction. To be more specific, the dewaxing of the extract is achieved by cooling or chilling the extract to at least about 170° F. and as low as about 70° F. While lower temperatures can be employed, because of the refrigeration costs in doing same relative to any technical benefits that might be realized thereby, they are less preferred. Preferably, the extract is cooled to a temperature in the range of about 150° to 100° F. Most preferably, a temperature in the range of about 130° to 110° F. is employed.

The equipment employed is not complicated and need not differ from that conventionally employed in conventional dewaxing or crystallization separation processes. Likewise, no technique special to this process is required for the separation of the solid wax phase formed during the cooling. Thus, either centrifuging or filtering are examples of techniques which can be satisfactorily employed. However, it is an advantage of the present invention that the dewaxing can be carried out in simpler and less expensive equipment than is conventionally employed. A cooled settling tank having draw-off means for each of the two phases suffices. The dewaxing can also be carried out in the extraction column by using a temperature gradient on the column.

It has also been found that the addition of a displacing agent, such as hexane, kerosene, spirits, and light lubes, e.g., 70 Neutral, constitutes an advantageous variation since it aids in the removal of wax from the extract. The displacing agent can be added either before, after, or during the cooling operation. About 1 to 10% (based on the weight of the extract oil) of the displacing agent should be employed. The displacing agent enables the dewaxing to be carried out at higher temperatures than when a displacing agent is not employed. Accordingly, slightly higher temperatures than those specified hereinabove can be satisfactorily employed with displacing agents.

ILLUSTRATIVE EXAMPLE

The crude employed was a Lagomedio crude which had the following approximate properties:

| | |
|---|---|
| Gravity, API° | 32.9 |
| Sulfur, wt. percent | 1.26 |
| SUS/100° F. | 52.7 |
| Pour point, ° F. | −30.0 |
| O.D. Color | 22270 |

The foregoing charge was vacuum distilled to produce the following fractions:

| | Boiling range |
|---|---|
| Light vacuum distillate | About 775°–855° F. |
| Heavy vacuum distillate | About 855°–955° F. |
| Vacuum tower residue | About 995°F. and above |

The heavy vacuum distillate was extracted with furfural at the following conditions:

Heavy vacuum distillate: Solvent dosage, 150%; Temperature, 220° F.; Extract yield, about 31%.

The waxy extract was separated into two portions and then dewaxed. Each portion of the extract was separately charged to a settling vessel equipped with cooling means and was cooled as follows:

Run I: Temperature, about 160° F.; Time, 15 minutes.
Run II: Temperature, about 120° F.; Time, 30 minutes.

In each case two separable phases were formed. The top thin layer was the waxy phase, and the bottom layer was the furfural and oil layer. These phases were readily separated in the laboratory by a separatory funnel. The product from Run I contained about 40% of the wax contained in the charge stock, whereas the product of Run II contained 0% or at least a negligible amount of wax.

In a continuous commercial operation, a plurality of cooled settling vessels can be employed to provide for adequate separation of the two phases, which can then be separately recovered.

We claim:

1. A process for preparing rubber oils from Lagomedio crude which comprises solvent extracting a lube oil fraction thereof with a solvent having preferential solubility for aromatics, then cooling the extract to a temperature at least as low as 170° F. for a time sufficient to form a waxy phase and a solvent-oil phase, separating said solvent-oil phase, and then recovering the oil from the solvent.

2. A process according to claim 1 wherein said extract is cooled to a temperature in the range of about 170° to 70° F.

3. A process according to claim 1 wherein said solvent is furfural.

4. A process according to claim 1 wherein said solvent is phenol.

5. A process according to claim 3 wherein said extract is cooled to a temperature in the range of about 170° to 70° F.

6. A process according to claim 5 wherein said lube oil fraction boils above about 650° F. and is substantially free of asphaltenes and metals.

7. A process according to claim 6 wherein said extract is cooled to a temperature in the range of about 150° to 100° F.

8. A process according to claim 1 wherein said extraction of the lube oil fraction is carried out at a solvent to oil ratio in the range of about 6:1 to 0.25:1 and a temperature in the range of about 0° to 350° F.

9. A process according to claim 7 wherein said extraction of the lube oil fraction is carried out at a solvent to oil ratio in the range of about 4:1 to 0.8:1 and a temperature in the range of about 125° to 325° F.

10. A process according to claim 9 wherein said extract is cooled to a temperature in the range of about 130° to 1710° F.

11. In a process wherein lube oil fraction derived from a Lagomedio crude is solvent extracted with a solvent having preferential solubility for aromatics to prepare a raffinate and an extract, the improvement which comprises dewaxing said extract so formed by cooling said extract to a temperature at least as low as about 170° F. to form a waxy phase and a solvent-oil phase, separating said solvent-oil phase, and recovering the oil therefrom.

12. A process according to claim 11 wherein said lube oil fraction boils above about 650° F., said solvent is furfural, and said extraction has been carried out at a temperature in the range of about 125° to 325° F. at a solvent to oil ratio in the range of about 4:1 to 0.8:1.

13. A process according to claim 12 wherein said extract is cooled to a temperature in the range of about 150° to 100° F.

14. A process according to claim 12 wherein said extract is cooled to a temperature in the range of about 130° to 110° F.

15. A process according to claim 14 wherein said cooling for dewaxing is carried out in at least one cooled gravitational settling tank.

16. A process according to claim 11 wherein a displacing agent is employed in said dewaxing operation.

17. A process according to claim 16 wherein a slightly higher temperature is employed for said dewaxing with a displacing agent than is employed for dewaxing in the absence of a displacing agent.

References Cited

UNITED STATES PATENTS

| | | | |
|---|---|---|---|
| 2,415,541 | 2/1947 | Soday | 208—14 |
| 2,447,732 | 8/1948 | Cambell et al. | 208—14 |
| 2,778,808 | 1/1957 | Dunkel et al. | 208—14 |

HERBERT LEVINE, Primary Examiner

U.S. Cl. X.R.

208—14, 36, 37, 327, 333; 260—33.6